United States Patent
Lu

(10) Patent No.: US 12,481,254 B2
(45) Date of Patent: Nov. 25, 2025

(54) APPARATUS AND METHOD FOR MANAGING INDUSTRIAL PROCESS OPTIMIZATION RELATED TO BATCH OPERATIONS

(71) Applicant: Honeywell International Inc., Charlotte, NC (US)

(72) Inventor: Joseph Lu, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 512 days.

(21) Appl. No.: 17/866,089

(22) Filed: Jul. 15, 2022

(65) Prior Publication Data
US 2023/0044522 A1 Feb. 9, 2023

Related U.S. Application Data

(60) Provisional application No. 63/222,776, filed on Jul. 16, 2021.

(51) Int. Cl.
*G05B 13/04* (2006.01)
*G05B 23/02* (2006.01)

(52) U.S. Cl.
CPC ....... *G05B 13/042* (2013.01); *G05B 23/0294* (2013.01)

(58) Field of Classification Search
CPC .......................... G05B 13/042; G05B 23/0294
USPC .......................................................... 700/28
See application file for complete search history.

(56) References Cited

U.S. PATENT DOCUMENTS

| | | | |
|---|---|---|---|
| 2005/0197930 A1 | 9/2005 | Polarine | |
| 2006/0230787 A1* | 10/2006 | Lehman | C03C 1/002 65/335 |
| 2009/0054998 A1* | 2/2009 | Beerbaum | G05B 13/024 700/29 |
| 2011/0130857 A1* | 6/2011 | Budiman | G06Q 50/04 700/104 |
| 2012/0296690 A1* | 11/2012 | Varvarezos | G06Q 10/06 705/7.26 |
| 2016/0042074 A1* | 2/2016 | Mu | G16C 99/00 707/710 |

OTHER PUBLICATIONS

International Search Report and Written Opinion for PCT/US2022/037346 (ISA/EP) mailed Oct. 20, 2022 (14 pages).

* cited by examiner

*Primary Examiner* — Jigneshkumar C Patel
(74) *Attorney, Agent, or Firm* — Alston & Bird LLP

(57) ABSTRACT

Various embodiments described herein relate to management of industrial process optimization related to batch operations. In this regard, an optimization request to optimize an industrial process that produces an industrial process product is received. In response to the optimization request, product spent characteristics for one or more blending components of a batch operation subprocess are determined. Also in response to the optimization request, demand data for one or more feed products associated with the one or more blending components is updated based on the product spent characteristics and inventory data indicative of an inventory level for the one or more feed products. Furthermore, a control signal configured based on the demand data is transmitted to a controller configured for optimization associated with the industrial process that produces the industrial process product.

20 Claims, 12 Drawing Sheets

APPARATUS AND METHOD FOR MANAGING INDUSTRIAL PROCESS OPTIMIZATION RELATED TO BATCH OPERATIONS

CROSS-REFERENCE TO RELATED APPLICATIONS

This application claims the benefit of U.S. Provisional Patent Application No. 63/222,776, titled "APPARATUS AND METHOD FOR MANAGING INDUSTRIAL PROCESS OPTIMIZATION RELATED TO BATCH OPERATIONS," and filed on Jul. 16, 2021, the entirety of which is hereby incorporated by reference.

TECHNICAL FIELD

The present disclosure relates generally to industrial process control systems, and more particularly to management of industrial process optimization related to batch operations.

BACKGROUND

Processing facilities are often managed using industrial process control systems. For certain types of industrial processes such as, for example, oil and gas processes, a batch operation can be concatenated to one or more other industrial processes (e.g., one or more other continuous industrial processes). In one example, a batch operation can blend different blending components to form a refinery product. However, a batch operation can disrupt one or more other industrial processes and/or one or more optimization operations related to a processing facility. For example, a batch operation can be configured with an on-and-off functionality associated with a starting time and/or duration that is generally not predictable. As such, a batch operation can cause one or more other industrial processes and/or one or more optimization operations related to a processing facility to be performed in an inefficient and/or undesirable manner (e.g., a cyclic manner) with respect to operation of the processing facility under an industrial process control system.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive an optimization request to optimize an industrial process that produces an industrial process product. In response to the optimization request, the one or more programs comprise instructions configured to determine product spent characteristics for one or more blending components of a batch operation subprocess. In response to the optimization request, the one or more programs also comprise instructions configured to update, based on the product spent characteristics and inventory data indicative of an inventory level for one or more feed products associated with the one or more blending components, demand data for the one or more feed products. Additionally, in response to the optimization request, the one or more programs comprise instructions configured to transmit a control signal configured based on the demand data to a controller configured for optimization associated with the industrial process that produces the industrial process product.

In another embodiment, a method comprises, at a device with one or more processors and a memory, receiving an optimization request to optimize an industrial process that produces an industrial process product. In response to the optimization request, the method also comprises determining product spent characteristics for one or more blending components of a batch operation subprocess, updating, based on the product spent characteristics and inventory data indicative of an inventory level for one or more feed products associated with the one or more blending components, demand data for the one or more feed products, and transmitting a control signal configured based on the demand data to a controller configured for optimization associated with the industrial process that produces the industrial process product.

In yet another embodiment, a non-transitory computer-readable storage medium comprises one or more programs for execution by one or more processors of a device. The one or more programs comprise instructions which, when executed by the one or more processors, cause the device to receive an optimization request to optimize an industrial process that produces an industrial process product. In response to the optimization request, the one or more programs comprise instructions which, when executed by the one or more processors, cause the device to determine product spent characteristics for one or more blending components of a batch operation subprocess. In response to the optimization request, the one or more programs also comprise instructions which, when executed by the one or more processors, cause the device to update, based on the product spent characteristics and inventory data indicative of an inventory level for one or more feed products associated with the one or more blending components, demand data for the one or more feed products. Additionally, in response to the optimization request, the one or more programs comprise instructions which, when executed by the one or more processors, cause the device to transmit a control signal configured based on the demand data to a controller configured for optimization associated with the industrial process that produces the industrial process product.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
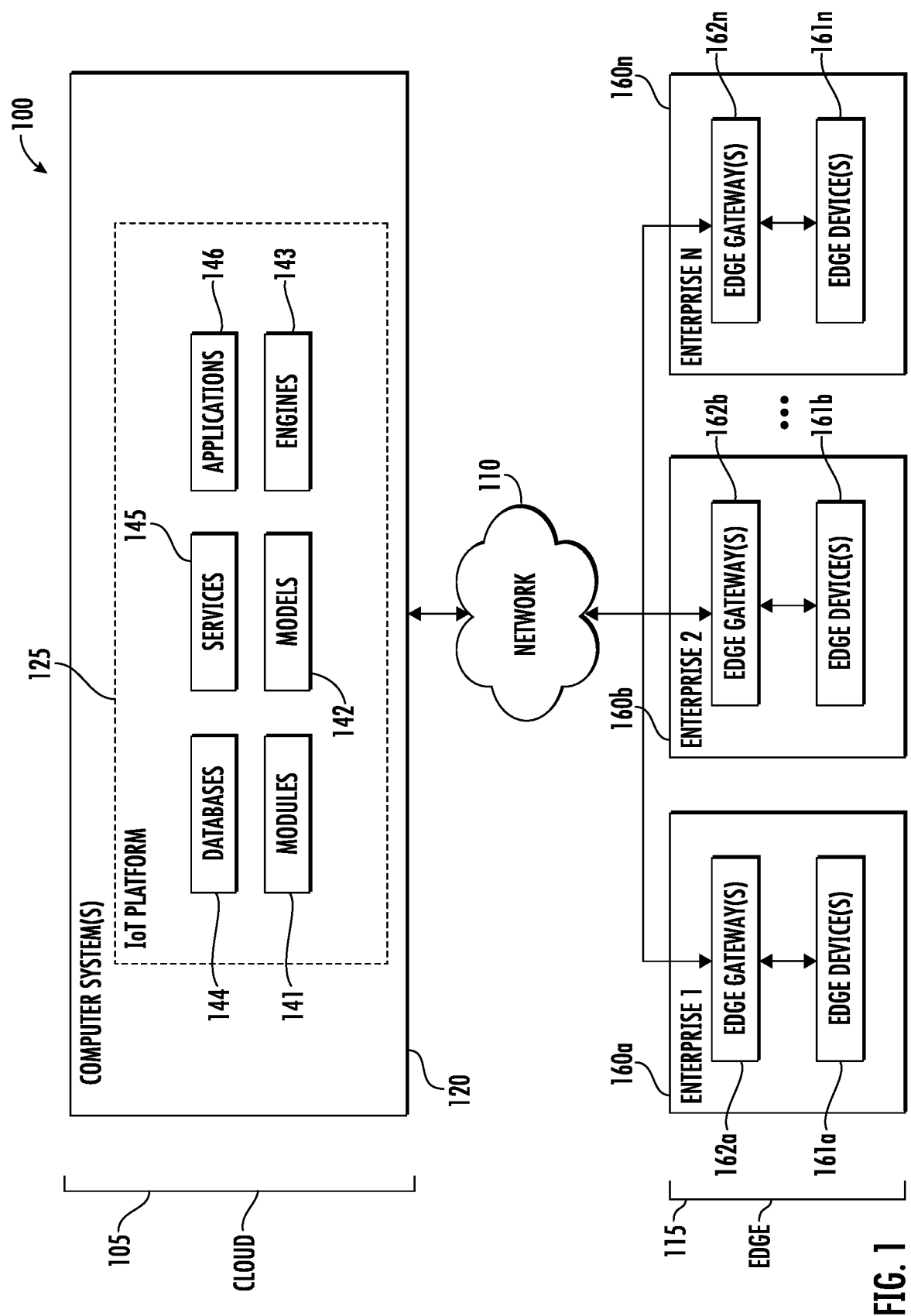
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In one or more embodiments, the present disclosure provides for an "Internet-of-Things" or "IoT" platform for industrial process control and/or industrial process optimization that uses real-time accurate models and/or real-time control for sustained peak performance of an enterprise and/or an enterprise process. The IoT platform is an extensible platform that is portable for deployment in any cloud or data center environment for providing an enterprise-wide, top to bottom control of processes and/or assets. Further, the IoT platform of the present disclosure supports end-to-end capability to execute models against process data and/or to translate the output into actionable insights and/or real-time control, as detailed in the following description.

Processing facilities are often managed using industrial process control systems. For certain types of industrial processes such as, for example, oil and gas processes, a batch operation can be performed in addition to one or more other industrial processes (e.g., one or more other continuous industrial processes). In one example, a batch operation can blend different blending components to form a refinery product. However, a batch operation can disrupt one or more other industrial processes and/or one or more optimization operations related to a processing facility. For example, a batch operation can be configured with an on-and-off functionality associated with a starting time and/or duration that is generally not predictable. As such, a batch operation can cause one or more other industrial processes and/or one or more optimization operations related to a processing facility to be performed in an inefficient manner (e.g., a cyclic manner) with respect to operation of the processing facility. It is therefore advantageous to optimize a batch operation with respect to one or more other industrial processes and/or one or more optimization operations related to a processing facility in order to achieve optimal performance and/or optimal efficiency for one or more industrial processes.

Thus, to address these and/or other issues, management of industrial process optimization related to batch operations is provided. In one or more embodiments, harmonization between plantwide optimization and one or more batch operations is provided. In one or more embodiments, optimization between one or more continuous operations and one or more batch operations in a hybrid plant is provided. In various embodiments, the management of the industrial process optimization provides one or more optimal recipes (e.g., optimal batch blending recipes, optimal batch-blending plantwide recipes, etc.) for an industrial process. In certain embodiments, the industrial process includes batch product blending for an oil refinery. In certain embodiments, the industrial process includes filter washing processes in a chemical refinery (e.g., an alumina refinery, etc.) or a lubricant plant. However, it is to be appreciated that, in certain embodiments, the industrial process is a different type of industrial process.

In various embodiments, a virtual content tracker is strategically inserted into a continuous control process or an optimization process (e.g., a plant optimizer) for an industrial process or industrial facility to monitor spent inventory for a batch process. In one or more embodiments, the virtual content tracker is a discontinuous system configured for monitoring spent inventory related to a batch process. In one or more embodiments, the virtual content tracker is employed with an asynchronous update scheme that is configured to determine how batch operations or batch productions should be updated when a continuous optimizer (e.g., a plantwide optimizer) receives new input at a pre-specified frequency, or at a user request.

As such, by employing one or more techniques disclosed herein, batch disruptions with respect to an industrial process is minimized or eliminated (e.g., as if the batch operations had been converted into continuous operations for the industrial process). Additionally, by employing one or more techniques disclosed herein, smooth plantwide control and/or optimization solutions related to the batch operations are provided (e.g., zig-zagged optimization solutions related to the batch operations are minimized or eliminated). Moreover, by employing one or more techniques disclosed herein, industrial process performance and/or industrial process efficiency is optimized. In various embodiments, an amount of time and/or an amount of processing related to an industrial process is reduced. Additionally, in one or more embodiments, performance of a processing system (e.g., a control system) associated with an industrial process is improved by employing one or more techniques disclosed herein. For example, in one or more embodiments, a number of computing resources, a number of a storage requirements, and/or number of errors associated with a processing system (e.g., a control system) for an industrial process is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud layer 105, a network 110, and an edge 115. As detailed further below, components of the edge 115 are in communication with components of the cloud 105 via the network 110. In one or more embodiments, the network 110 is a network layer and/or the edge 115 is an edge layer.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprises any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, processing facilities, industrial plants, oil and gas facilities (e.g., oil refineries), chemical processing facilities (e.g., metal refinery, alumina refinery, etc.), lubricant industrial plants, manufacturing plants, buildings, warehouses, real estate facilities, laboratories, companies, divisions, aircrafts, spacecrafts, automobiles, ships, boats, military vehicles, or any other type of entity, facility, and/or vehicle that includes any number of local devices.

Figure 2:
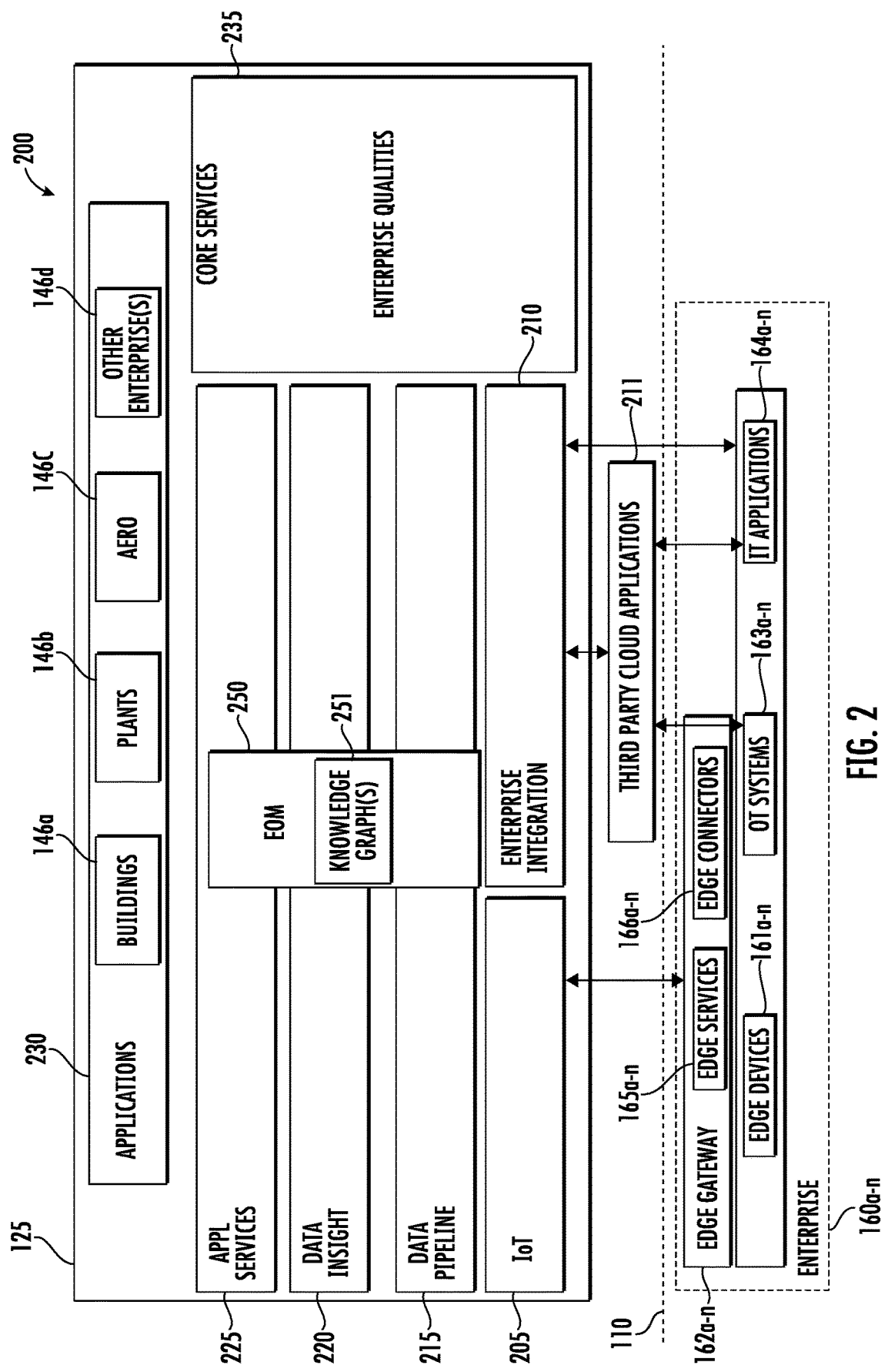
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include sensors, units, storage tanks, air handler units, fans, actuators, valves, pumps, ducts, processors, computers, vehicle components, cameras, displays, doors, windows, security components, HVAC components, factory equipment, refinery equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 160a-160n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for plantwide optimization that uses real-time accurate models and/or real-time data to deliver intelligent actionable recommendations and/or real-time control for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, in certain embodiments, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a key performance indicator (KPI) framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

In certain embodiments, the modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. In certain embodiments, the complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, in one or more embodiments, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a fan template defines fan efficiency calculations such that every time a fan is configured, the standard efficiency calculation is automatically executed for the fan. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about optimal corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, in certain embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services.

The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance, asset health, and/or asset predictive maintenance. According to various embodiments, autonomous control includes plantwide optimization, energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/ entitlements, logging/monitoring, usage metering, API gateway/dev portal, and the IoT platform 125 streams.

Figure 3A:
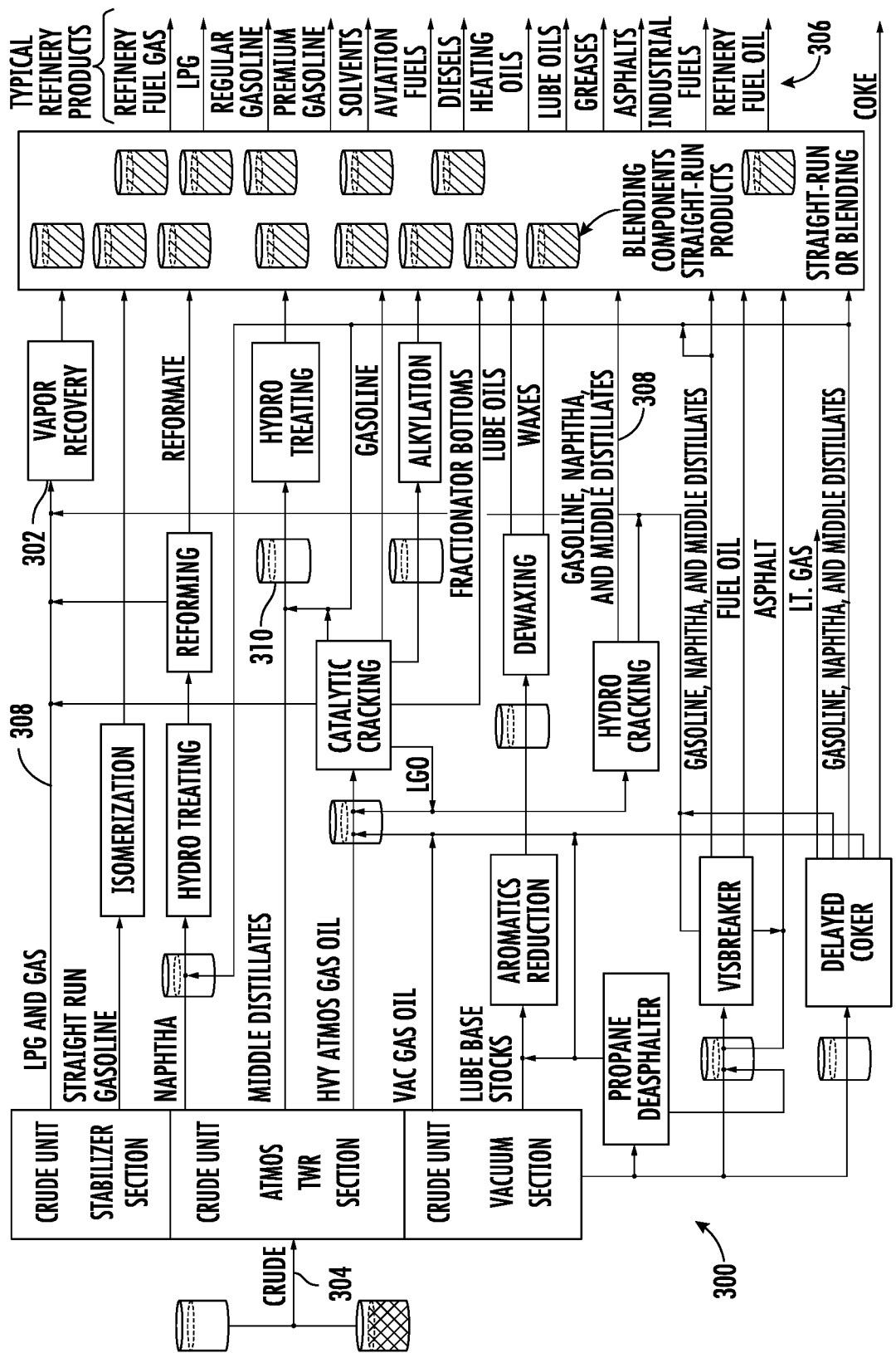
FIG. 3A illustrates a planning model, in accordance with one or more embodiments described herein.
Figure 3B:
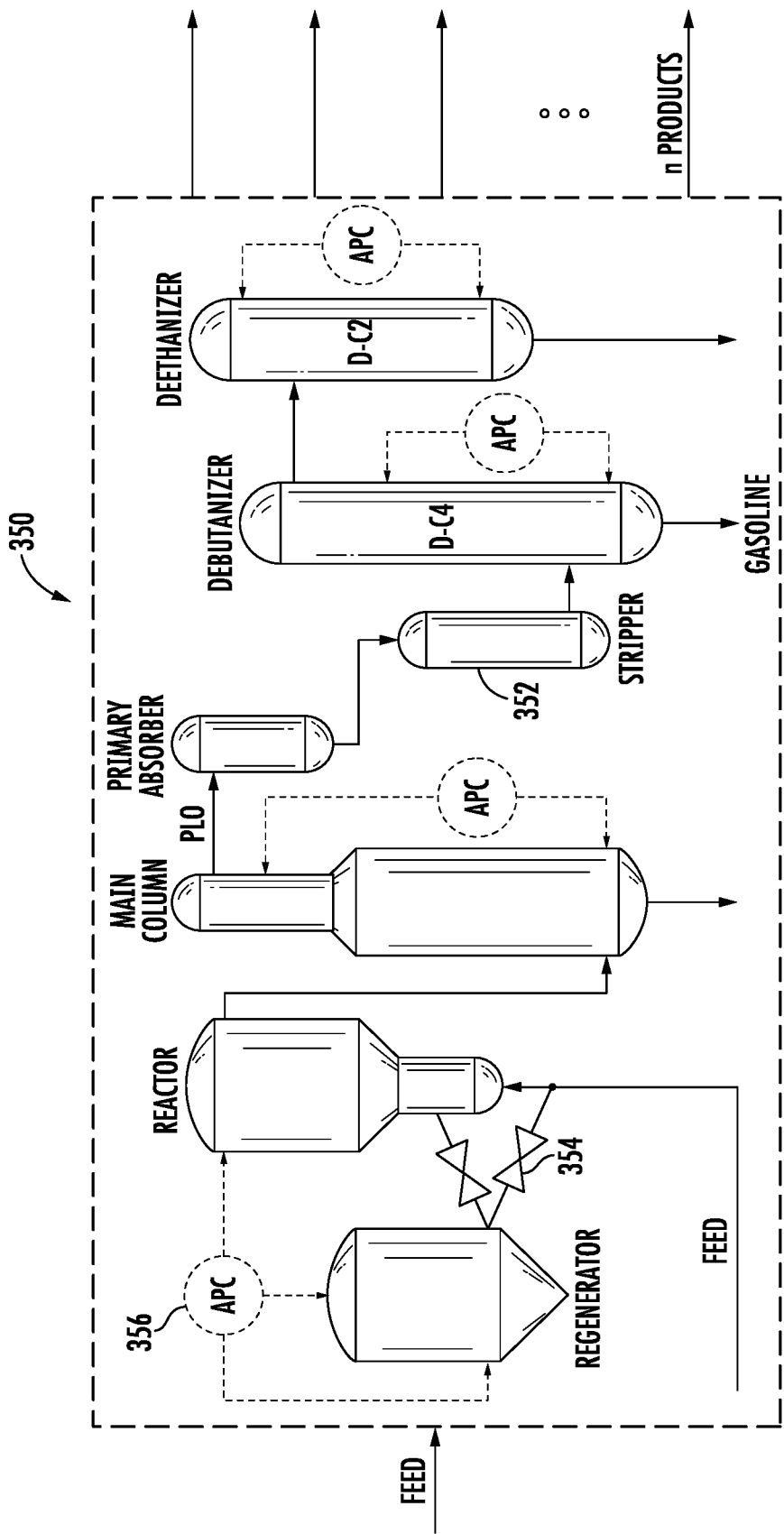
FIG. 3B illustrates a model predictive control (MPC) model, in accordance with one or more embodiments described herein.

FIG. 3A represents a planning model 300 according to one or more embodiments of the disclosure. FIG. 3B represents a model predictive controller (MPC) model 350 according to one or more embodiments of the disclosure.

The planning model 300 and the MPC model 350 are an example of a multiscale model pair employed in certain embodiments to solve multi-level problems in a cascaded MPC architecture. In certain embodiments, the planning model 300 and/or the MPC model 350 are employed to support a cascaded MPC approach in an industrial process system (e.g., an industrial process control system, an industrial process control and automation system, etc.). In certain embodiments, the planning model 300 is a yield-based planning model.

As shown in FIG. 3A, the planning model 300 identifies multiple units 302, which generally operate to convert one or more input streams 304 of feed materials into one or more output streams 306 of processed materials. In this example, the units 302 denote components in an oil and gas refinery that convert a single input stream 304 (crude oil) into multiple output streams 306 (different refined oil/gas products). Various intermediate components 308 are created by the units 302, and one or more storage tanks 310 could be used to store one or more of the intermediate components 308. As shown in FIG. 3B, the MPC model 350 identifies multiple components 352 of a single unit. Various valves and other actuators 354 can be used to adjust operations within the unit, and various APCs and other controllers 356 can be used to control the actuators within the unit.

In general, the planning model 300 analyzes an entire plant (or portion thereof) with a "bird's eye" view and thus represents individual units on a coarse scale. In one or more embodiments, the planning model 300 focuses on the inter-unit steady-state relationships pertaining to unit productions, product qualities, material and energy balances, and manufacturing activities inside the plant. In one or more embodiments, the planning model 300 is composed of process yield models and product quality properties. In one or more embodiments, the planning model 300 is constructed from a combination of various sources, such as planning tools, scheduling tools, yield validation tools and/or historical operating data. In one or more embodiments, the MPC model 350, however, represents at least one unit on a finer scale. In one or more embodiments, the MPC model 350 focuses on the intra-unit dynamic relationships between controlled variables (CVs), manipulated variables (MVs), and disturbance variables (DVs) pertaining to the safe, smooth, and efficient operation of a unit. The time scales of the two models 300, 350 are also different. In one or more embodiments, time horizon of the MPC model 350 ranges from minutes to hours, while a time horizon of the planning model 300 ranges from days to months. Note that a "controlled variable" generally denotes a variable whose value is controlled to be at or near a setpoint or within a desired range, while a "manipulated variable" generally denotes a variable that is adjusted in order to alter the value of at least one controlled variable. A "disturbance variable" generally denotes a variable whose value can be considered but not controlled or adjusted.

In one or more embodiments, the planning model 300 excludes non-production-related or non-economically-related variables, such as pressures, temperatures, tank levels, and valve openings within each unit. For example, in one or more embodiments, the planning model 300 reduces a process unit to one or several material or energy yield vectors. The MPC model 350, on the other hand, typically includes all of the operating variables for control purposes in order to help ensure the safe and effective operation of a unit. As a result, in one or more embodiments, the MPC model 350 includes many more variables for a unit compared to the planning model 300. As a non-limiting example, the MPC model 350 for a Fluidized Catalytic Cracking Unit (FCCU) of an oil refinery contains approximately 100 CVs (outputs) and 40 MVs (inputs). In certain embodiments, the planning model 300 of the same unit determines key causal relationships between the feed quality and operating modes (as inputs) and the FCCU product yield and quality (as outputs). As a non-limiting example, the planning model 300 includes three or four inputs and ten outputs.

Figure 4:
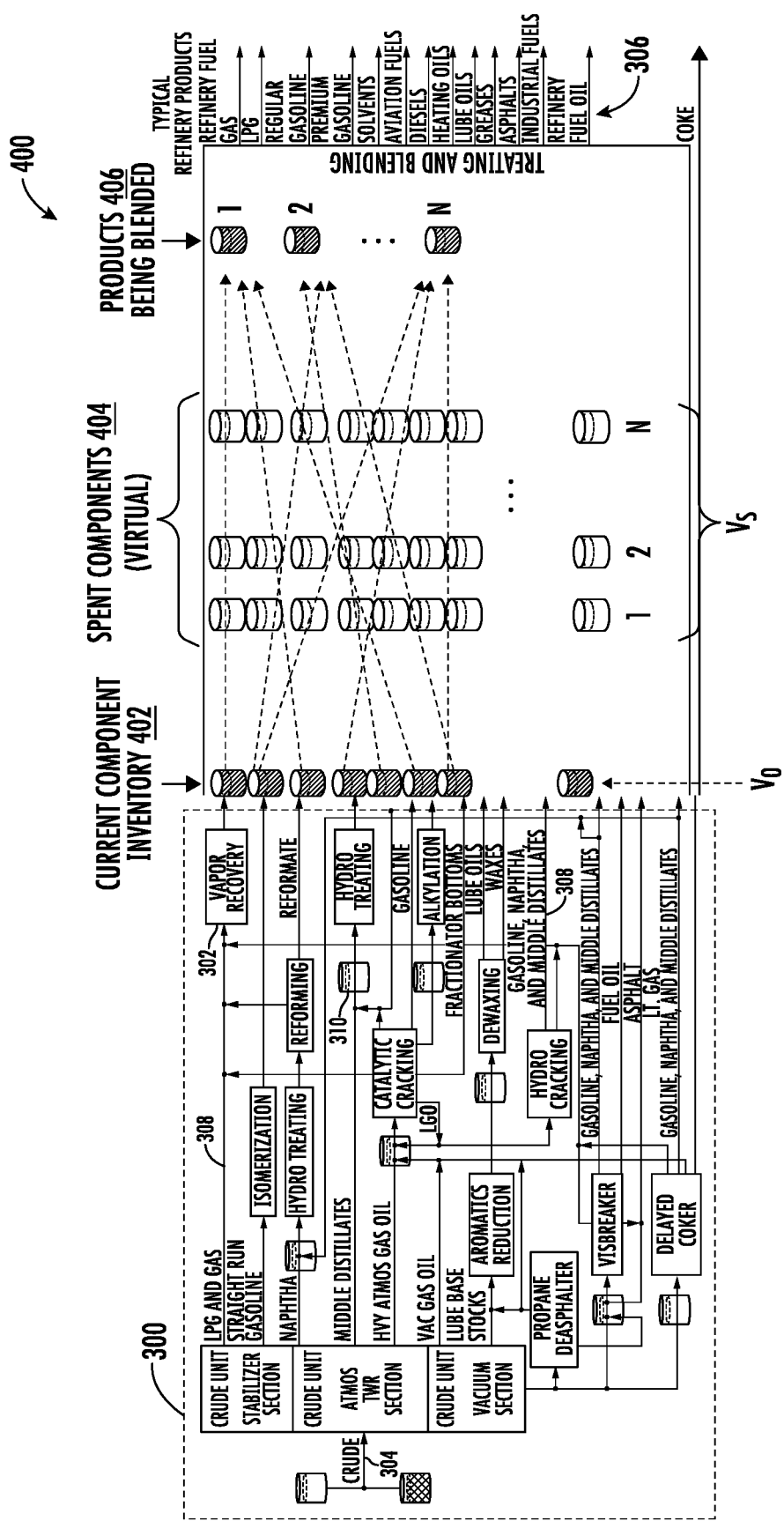
FIG. 4 illustrates a system that provides management of industrial process optimization related to batch operations, in accordance with one or more embodiments described herein.

FIG. 4 illustrates a system 400 according to one or more described features of one or more embodiments of the disclosure. In one or more embodiments, the system 400 facilitates harmonizing control/optimization solutions under disruptive batch operations. The system 400 includes the planning model 300, current component inventory 402, spent components 404, products 406 being blended, and the one or more output streams 306 of processed materials. In one or more embodiments, the spent components 404 are associated with an asynchronous update scheme and/or a virtual content tracker. Furthermore, in one or more embodiments, the spent components 404 are implemented between continuous control associated with the planning model 300 (e.g., one or more optimization processes associated with the planning model 300) and the products 406 being blended. In one or more embodiments, the current component inventory 402 is employed for one or more batch operations (e.g., a batch process) associated with the products 406 being blended. In one or more embodiments, the products 406 being blended are blending components (e.g. intermediate components) that are combined to create the one or more output streams 306 of processed materials. In one or more embodiments, the one or more output streams 306 correspond to final products. In one or more embodiments, the spent components 404 monitor content in the current component inventory 402 and/or an amount of material in the current component inventory 402. Additionally or alternatively, in one or more embodiments, the spent components 404 monitor content in the products 406 being blended and/or an amount of material in the products 406 being blended.

In certain embodiments, if a batch process is completed, the spent components 404 update an inventory count associated with the current component inventory 402. Furthermore, in certain embodiments, if a batch process is completed, the spent components 404 additionally or alternatively resets a virtual content tracker associated with the current component inventory 402 and/or the products 406 being blended to zero. In certain embodiments, if demand associated with the current component inventory 402 (e.g., a number of requests for product associated with the current component inventory 402) is altered, the spent components 404 update demand data for the current component inventory 402. In certain embodiments, if demand associated with a continuous industrial process has a receding horizon formulation, the spent components 404 reset a new receding time horizon to reflect time remaining for fulfilling the demand and/or for completing a task associated with the continuous industrial process. As such, a receding horizon solution for an industrial process can be converted to an asynchronous receding horizon solution.

As an example, for N physical blenders, Vs is comprised of N columns of spent component inventories:

$$V_s = V_{s,1} + V_{s,2} + \ldots + V_{s,N}$$

where, for each column. "$V_{s,i}$" represents the spent components 404 for blending the i-th product in a batch process. In an embodiment, "$V_{s,i}$" is determined by measuring and/or accumulating component draws for blending the i-th product since the start of a batch process. In another embodiment, "$V_{s,i}$" is determined by measuring volume (or a level) in the i-th product tank and back-calculating the spent components 404.

In certain embodiments, an asynchronous update scheme associated with the spent components 404 is executed based on a schedule for an industrial process. In certain embodiments, an asynchronous update scheme associated with the spent components 404 is executed based on one or more conditions being satisfied for an industrial process.

In one or more embodiments, a future component vector cm for optimization of an industrial process corresponds to:

$$c_m = \int_0^{m-ts} G_F * u \, dt + V_0 + V_s = \int_t^{Ts} G_F * u \, dt + V_0 + V_s$$

where ts is an elapsed time since a previous asynchronous update scheme, and Ts is the TimeStamp of the previous asynchronous update scheme +m. $G_F$ corresponds to a Laplace transfer function for a continuous process (e.g., a continuous optimization process) related to an industrial process. For example, in an embodiment, $G_F$ corresponds to a Laplace transfer function for a continuous portion of an industrial plant (e.g., a processing plant, a refinery, etc.). In certain embodiments, $G_F$ corresponds to a model partition for component flow rates (e.g., a model related to an effect on component flows). Further details are provided by U.S. patent application Ser. No. 14/336,888 filed Jul. 21, 2014 and U.S. patent application Ser. No. 17/084,157 filed Oct. 29, 2020, the entire contents of each of which are expressly incorporated by reference herein in their entirety. In certain embodiments, if any batch blend is completed, a product amount associated with the batch blend is subtracted from Pm and a corresponding "$V_{s,i}$" is reset to zero. In certain embodiments, if demand is changed either in by a certain amount or timing is altered (e.g., since a previous asynchronous update scheme), the new demand is added to Pm, ts is reset to zero, and m is set to a new value.

In certain embodiments, an asynchronous update scheme is tuned. For instance, for a time period (t, t+m) where t is the present time, if all product deliveries within the time period are confirmed, the time period (t, t+m) is defined as a confirmed period. In one or more embodiments, the internal optimization time horizon, m1, is shorter than or equal to m. In general, the shorter m1 is, the more quickly the current inventory V0 will be depleted to a low limit.

In certain embodiments, the confirmed demand vector Pm is modified to a modified demand vector Pm1=(m1/m)*Pm. Furthermore, in certain embodiments, the future component vector cm is altered to a revised cm1 that corresponds to:

$$c_{m1} = \int_0^{m1-ts} G_F^* u \, dt + V_0 + V_s = \int_t^{Ts1} G_F^* u \, dt + V_0 + V_s$$

where Ts1 is the TimeStamp of the last the previous asynchronous update scheme +m1.

Figure 5:
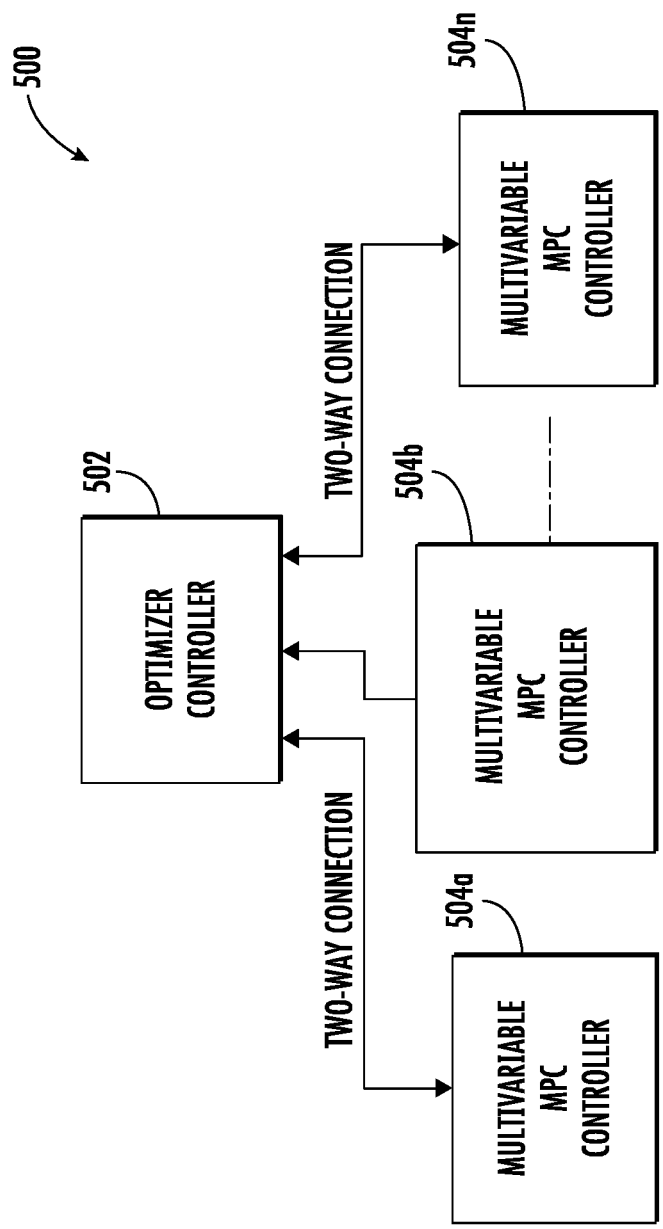
FIG. 5 illustrates a system that provides a cascaded MPC architecture for plantwide control and optimization, in accordance with one or more embodiments described herein.

FIG. 5 illustrates a system 500 according to one or more described features of one or more embodiments of the disclosure. The system 500 includes an optimizer controller 502 and one or more multivariable MPC controllers 504a-n. For example, in one or more embodiments, the optimizer controller 502 is a primary controller (e.g., a master MPC controller) and the one or more multivariable MPC controllers 504a-n are one or more secondary controllers. In one or more embodiments, the optimizer controller 502 and the one or more multivariable MPC controllers 504a-n represent respective computing devices. For example, in one or more embodiments, the optimizer controller 502 and the one or more multivariable MPC controllers 504a-n each include one or more processing devices and one or more memories for storing instructions and data used, generated, or collected by the one or more processing devices. In one or more embodiments, the optimizer controller 502 and the one or more multivariable MPC controllers 504a-n each also include at least one network interface such as one or more Ethernet interfaces or one or more wireless transceivers. In one or more embodiments, an industrial process control system associated with the optimizer controller 502 and the one or more multivariable MPC controllers 504a-n includes one or more sensors, one or more actuators, one or more other controllers, one or more servers, one or more operator stations, one or more networks, and/or one or more other components.

In one or more embodiments, the optimizer controller 502 and the one or more multivariable MPC controllers 504a-n are configured as a cascaded MPC architecture for plantwide control and optimization to facilitate plantwide optimization as part of an automatic control and automation system. In one or more embodiments, the optimizer controller 502 is configured to use a planning model (e.g., the planning model 300) as a seed model. In one or more embodiments, the optimizer controller 502 performs plantwide economic optimization using one or more optimization processes to control production inventories, manufacturing activities, or product qualities inside a plant. In one or more embodiments, the optimizer controller 502 is cascaded on top of the one or more multivariable MPC controllers 504a-n. In certain embodiments, the one or more multivariable MPC controllers 504a-n represent controllers at the unit level (Level 3) of a system, and each multivariable MPC controller from the one or more multivariable MPC controllers 504a-n provides the optimizer controller 502 with one or more respective operating state and/or respective constraints. As such, in one or more embodiments, a plantwide optimization solution provided by the optimizer controller 502 accounts for unit-level operating constraints from the one or more multivariable MPC controllers 504a-n. Jointly, the MPC cascade associated with the optimizer controller 502 and the one or more multivariable MPC controllers 504a-n simultaneously provides both decentralized controls (such as at the unit level) and centralized plantwide optimization (such as at the plant level) in a single consistent control system. The phrases "plantwide optimization" or "plantwide control" refers to optimization or control of multiple units in an industrial facility, regardless of whether those multiple units represent every single unit in the industrial facility.

In one or more embodiments, the MPC cascade solution associated with the optimizer controller 502 and the one or more multivariable MPC controllers 504a-n enables embedded real-time planning solutions to honor lower-level operating constraints. By cross-leveraging both planning and control models online, the MPC cascade solution associated with the optimizer controller 502 and the one or more multivariable MPC controllers 504a-n provides for a "reduced-horizon" form of planning optimization within a closed-loop control system in real-time. For instance, in one or more embodiments, the optimizer controller 502 is configured to provide reduced-horizon planning optimization. In one or more embodiments, the MPC cascade solution associated with the optimizer controller 502 and the one or more multivariable MPC controllers 504a-n is employed to automatically perform just-in-time production plans via the one or more multivariable MPC controllers 504a-n.

In one or more embodiments, a planning model (e.g., the planning model 300) determines a region for optimization and the MPC cascade solution associated with the optimizer controller 502 and the one or more multivariable MPC controllers 504a-n coordinates units and manages an industrial plant to provide optimal operating conditions for the industrial plant. In one or more embodiments, each of the one or more multivariable MPC controllers 504a-n comprise an embedded economic optimizer to facilitate providing optimal operating conditions for the industrial plant. In one or more embodiments, each of the one or more multivariable MPC controllers 504a-n additionally or alternatively provide multivariable control functions to facilitate providing optimal operating conditions for the industrial plant. In one or more embodiments, the optimizer controller 502 employs a planning model (e.g., the planning model 300) to provide an initial steady-state gain matrix and/or relevant model dynamics using operating data of the industrial plant. In one or more embodiments, the optimizer controller 502 is configured to control product inventories, manufacturing activities, and/or product qualities within the industrial plant. In one or more embodiments, the optimizer controller 502 provides real-time planning optimization for the industrial plant. In one or more embodiments, the one or more multivariable MPC controllers 504a-n provide the optimizer controller 502 with future predictions and/or operating constraints for each unit of the industrial plant.

Figure 6:
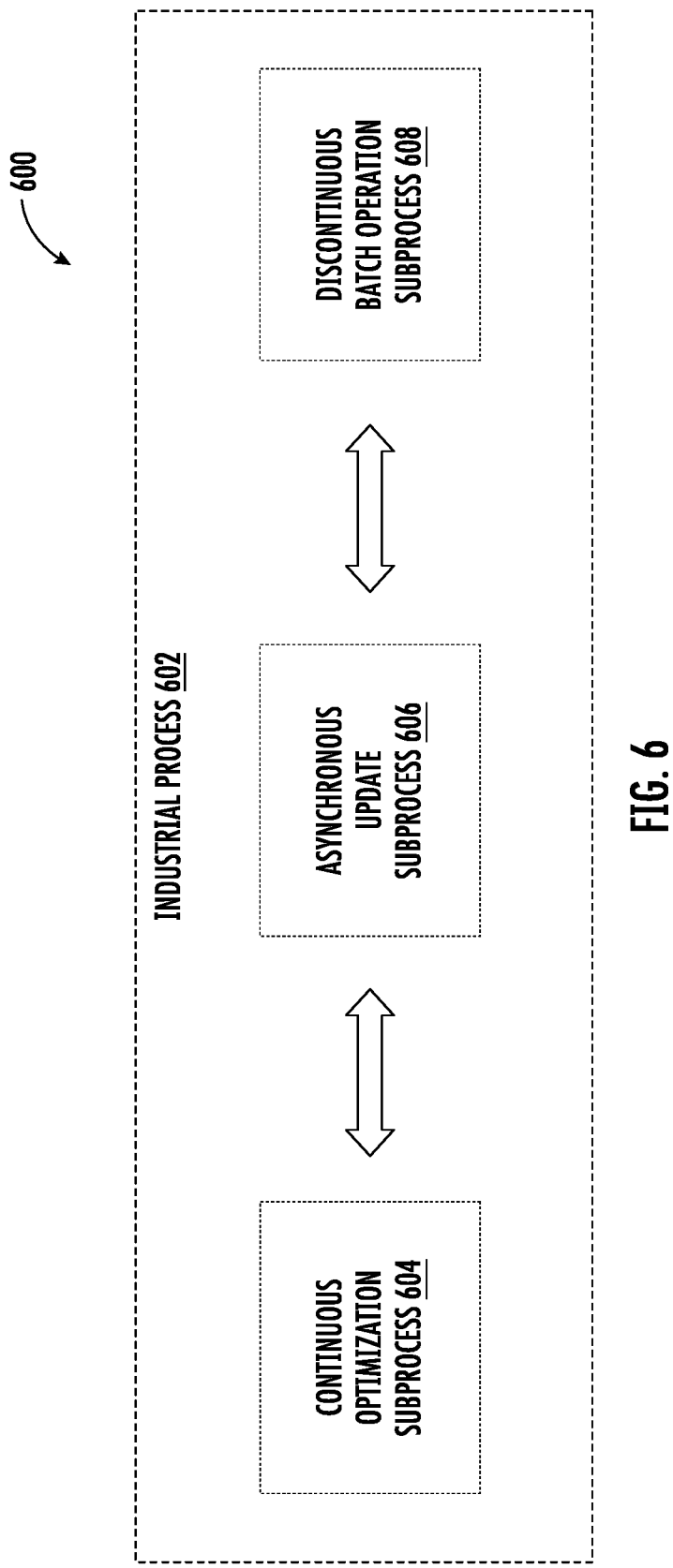
FIG. 6 illustrates an industrial process, in accordance with one or more embodiments described herein.

FIG. 6 illustrates an industrial process 602 according to one or more described features of one or more embodiments of the disclosure. In one or more embodiments, the industrial process 602 is an industrial process for an industrial plant. Furthermore, in one or more embodiments, the industrial process 602 produces one or more industrial process products (e.g., the one or more output streams 306 of processed materials). The industrial process 602 includes a continuous optimization subprocess 604, an asynchronous update subprocess 606 and a discontinuous batch operation subprocess 608. In one or more embodiments, the continuous optimization subprocess 604 is configured for optimizing continuous conversion of one or more input streams 304 of feed materials (e.g., petroleum stocks) into the current component inventory 402 (e.g., blending components). In one or more embodiments, the continuous optimization subprocess 604 is associated with the optimizer controller 502 and/or the one or more multivariable MPC controllers 504a-n. Additionally, in one or more embodiments, the discontinuous batch operation subprocess 608 is configured for non-continuous conversion of the current component inventory 402 (e.g., blending components) into the one or more output streams 306 of processed materials (e.g., refinery products). For example, in one or more embodiments, at least a portion of the discontinuous batch operation subprocess 608 occurs in a batch fashion. In certain embodiments, at least a portion of the discontinuous batch operation subprocess 608 occurs in a continuous fashion or assembly-line fashion during an interval of time that is different than an interval of time associated with the continuous optimization subprocess 604. In one or more embodiments, the asynchronous update subprocess 606 is configured for harmonizing the discontinuous batch operation subprocess 608 with respect to the continuous optimization subprocess 604. For example, in one or more embodiments, the asynchronous update subprocess 606 is configured to determine how one or more batch operations associated with the discontinuous batch operation subprocess 608 should be updated when the continuous optimization subprocess 604 receives new input at a pre-specified frequency.

Figure 7:
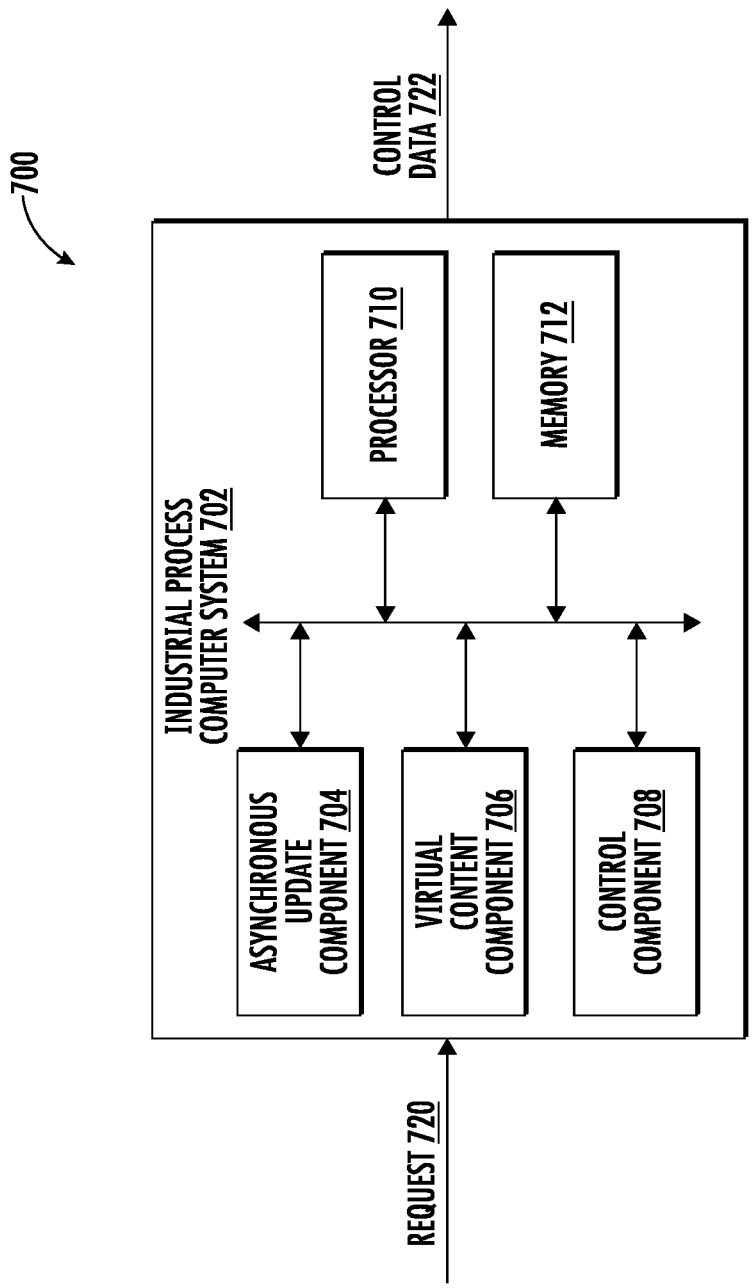
FIG. 7 illustrates a system that provides an exemplary industrial process computer system, in accordance with one or more embodiments described herein.

FIG. 7 illustrates a system 700 that provides an exemplary environment according to one or more described features of one or more embodiments of the disclosure. According to an embodiment, the system 700 includes an industrial process computer system 702 to facilitate a practical application of industrial process control and/or industrial process simulation for an industrial process. In one or more embodiments, the industrial process computer system 702 provides for management of industrial process optimization related to batch operations. In certain embodiments, the industrial process computer system 702 facilitates a practical application of machine learning technology to facilitate management of industrial process optimization related to batch operations. In one or more embodiments, the industrial process computer system 702 analyzes real-time industrial process data related to an industrial process to provide optimization, cost savings, and/or improved efficiency for the industrial process. In one or more embodiments, the industrial process computer system 702 is implemented via a controller (e.g., the optimizer controller 502 or another controller in communication with the optimizer controller 502).

In an embodiment, the industrial process computer system 702 is a server system (e.g., a server device) that facilitates a cloud-based industrial control platform. In one or more embodiments, the industrial process computer system 702 is a device with one or more processors and a memory. In one or more embodiments, the industrial process computer system 702 is a computer system from the computer systems 120. For example, in one or more embodiments, the industrial process computer system 702 is implemented via the cloud 105. The industrial process computer system 702 is also related to one or more technologies, such as, for example, industrial technologies, process plant technologies, oil and gas technologies, petrochemical technologies, refinery technologies, supply chain analytics technologies, sensor technologies, Internet of Things (IoT) technologies, enterprise technologies, smart building technologies, connected building technologies, connected asset technologies, connected edge-device technologies, HVAC technologies, modeling technologies, energy optimization technologies, predictive maintenance technologies, asset performance management technologies, data analytics technologies, digital transformation technologies, cloud computing technologies, cloud database technologies, server technologies, network technologies, wireless communication technologies, machine learning technologies, artificial intelligence technologies, digital processing technologies, electronic device technologies, computer technologies, aircraft technologies, cybersecurity technologies, navigation technologies, asset visualization technologies, procurement technologies, and/or one or more other technologies.

Moreover, the industrial process computer system 702 provides an improvement to one or more technologies such as industrial technologies, process plant technologies, oil and gas technologies, petrochemical technologies, refinery technologies, supply chain analytics technologies, sensor technologies, IoT technologies, enterprise technologies, smart building technologies, connected building technologies, connected asset technologies, connected edge-device technologies, HVAC technologies, modeling technologies, energy optimization technologies, predictive maintenance technologies, asset performance management technologies, data analytics technologies, digital transformation technologies, cloud computing technologies, cloud database technologies, server technologies, network technologies, wireless communication technologies, machine learning technologies, artificial intelligence technologies, digital processing technologies, electronic device technologies, computer technologies, aircraft technologies, cybersecurity technologies, navigation technologies, asset visualization technologies, procurement technologies, and/or one or more other technologies. In an implementation, the industrial process computer system 702 improves performance of an industrial plant. For example, in one or more embodiments, the industrial process computer system 702 optimizes one or more industrial processes for an industrial plant, improves processing efficiency of one or more controllers of an industrial plant, reduces power consumption of one or more controllers of an industrial plant, optimizes energy usage related to one or more controllers of an industrial plant, etc. Additionally or alternatively, in another implementation, the industrial process computer system 702 improves performance of a computing device (e.g., a server, a controller, a processor, etc.). For example, in one or more embodiments, the industrial process computer system 702 improves processing efficiency of a computing device, reduces power consumption of a computing device, improves quality of data provided by a computing device, etc.

The industrial process computer system 702 includes an asynchronous update component 704, a virtual content component 706 and/or a control component 708. Additionally, in certain embodiments, the industrial process computer system 702 includes a processor 710 and/or a memory 712. In certain embodiments, one or more aspects of the industrial process computer system 702 (and/or other systems, apparatuses and/or processes disclosed herein) constitute executable instructions embodied within a computer-readable storage medium (e.g., the memory 712). For instance, in an embodiment, the memory 712 stores computer executable component and/or executable instructions (e.g., program instructions). Furthermore, the processor 710 facilitates execution of the computer executable components and/or the executable instructions (e.g., the program instructions). In an example embodiment, the processor 710 is configured to execute instructions stored in the memory 712 or otherwise accessible to the processor 710.

The processor 710 is a hardware entity (e.g., physically embodied in circuitry) capable of performing operations according to one or more embodiments of the disclosure. Alternatively, in an embodiment where the processor 710 is embodied as an executor of software instructions, the software instructions configure the processor 710 to perform one or more algorithms and/or operations described herein in response to the software instructions being executed. In an embodiment, the processor 710 is a single core processor, a multi-core processor, multiple processors internal to the industrial process computer system 702, a remote processor (e.g., a processor implemented on a server), and/or a virtual machine. In certain embodiments, the processor 710 is in communication with the memory 712, the asynchronous update component 704, the virtual content component 706 and/or the control component 708 via a bus to, for example, facilitate transmission of data among the processor 710, the memory 712, the asynchronous update component 704, the virtual content component 706 and/or the control component 708. The processor 710 may embodied in a number of different ways and can, in certain embodiments, includes one or more processing devices configured to perform independently. Additionally or alternatively, in one or more embodiments, the processor 710 includes one or more processors configured in tandem via a bus to enable independent execution of instructions, pipelining of data, and/or multi-thread execution of instructions.

The memory 712 is non-transitory and includes, for example, one or more volatile memories and/or one or more non-volatile memories. In other words, in one or more embodiments, the memory 712 is an electronic storage device (e.g., a computer-readable storage medium). The memory 712 is configured to store information, data, content, one or more applications, one or more instructions, or the like, to enable the industrial process computer system 702 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the industrial process computer system 702 (e.g., the asynchronous update component 704 of the industrial process computer system 702) receives a request 720. In one or more embodiments, the request 720 is an optimization request to optimize an industrial process (e.g., the industrial process 602) that produces one or more industrial process products. In one or more embodiments, the request 720 is associated with a continuous optimization subprocess (e.g., the continuous optimization subprocess 604). Furthermore, in one or more embodiments, the request 720 is generated by a controller (e.g., the optimizer controller 502 and/or the one or more multivariable MPC controllers 504a-n). Alternatively, in one or more embodiments, the request 720 is generated by a user device (e.g., in response to user input provided via a user interface of the user device). The user device is a mobile computing device, a smartphone, a tablet computer, a mobile computer, a desktop computer, a laptop computer, a workstation computer, a wearable device, a virtual reality device, an augmented reality device, or another type of user device located remote from the industrial process computer system 702. In one or more embodiments, the request 720 is received in response to a determination that time data for the industrial process (e.g., a schedule for the industrial process) satisfies a defined criterion. In one or more embodiments, the request 720 is received in response to a determination that a condition (e.g., an industrial process event) associated with the industrial process satisfies a defined criterion.

In one or more embodiments, the industrial process is associated with components of the edge 115 such as, for example, one or more enterprises 160a-160n. In one or more embodiments, the industrial process is associated with one or more edge devices from the one or more edge devices 161a-161n. In one or more embodiments, the industrial process computer system 702 is in communication with one or more portions of an industrial plant (e.g., the optimizer controller 502 and/or the one or more multivariable MPC controllers 504a-n) via the network 110. For example, in certain embodiments, the industrial process computer system 702 receives data via the network 110 and/or transmits data via the network 110. In certain embodiments, the industrial process incorporates encryption capabilities to facilitate encryption of one or more portions of data received via the network 110 and/or one or more portions of data transmitted via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network.

In one or more embodiments, the request 720 includes inventory data. In one or more embodiments, the inventory data is indicative of an inventory level for one or more feed products associated with one or more blending components of a batch operation subprocess (e.g., the discontinuous batch operation subprocess 608). For instance, in one or more embodiments, the inventory data includes information associated with the current component inventory 402 and/or the products 406 being blended. In certain embodiments, the inventory data includes information associated with component flow rate and/or component flow quality for the current component inventory 402 and/or the products 406 being blended. In one or more embodiments, the request 720 additionally or alternatively includes an industrial process identifier that indicates an identity of an industrial process and/or one or more assets associated with the industrial process. The industrial process identifier in the request 720 is a digital code such as, for example, a machine-readable code, a combination of numbers and/or letters, a string of bits, a barcode, a Quick Response (QR) code, or another type of identifier for the industrial process. Furthermore, the asset identifier in the request 720 facilitates identification of the industrial process.

The asynchronous update component 704 employs the request 720 and/or information related to the request 720 to facilitate optimization of one or more portions of the industrial process. For example, in one or more embodiments, asynchronous update component 704 employs the request 720 and/or information related to the request 720 to facilitate harmonizing a discontinuous batch operation subprocess of the industrial process (e.g., the discontinuous batch operation subprocess 608) with respect to a continuous optimization process of the industrial process (e.g., the continuous optimization subprocess 604). In one or more embodiments, in response to the request 720, the asynchronous update component 704 determines product spent characteristics for one or more blending components of a batch operation subprocess (e.g., the discontinuous batch operation subprocess 608). For example, in an embodiment, the asynchronous update component 704 determines content of material used by one or more blending components of one or more batch operations associated with the batch operation subprocess. Additionally or alternatively, in an embodiment, the asynchronous update component 704 determines an amount of material used by one or more blending components of one or more batch operations associated with the batch operation subprocess. In one or more embodiments, the asynchronous update component 704 determines the product spent characteristics based on industrial process product characteristics for the industrial process product. In one or more embodiments, the asynchronous update component 704 determines the product spent characteristics based on monitoring an amount of material included in the one or more blending components. In one or more embodiments, the asynchronous update component 704 determines the product spent characteristics by predicting one or more product spent characteristics (e.g., using machine learning). For example, in one or more embodiments, the asynchronous update component 704 performs a machine learning process with respect to industrial process data related to the industrial process. In certain embodiments, the asynchronous update component 704 determines at least a portion of the product spent characteristics based on relationships, correlations and/or predictions between aspects of industrial process data related to the industrial process. In one or more embodiments, the asynchronous update component 704 determines the product spent characteristics based on one or more virtual spent components for the one or more blending components.

In one or more embodiments, the virtual content component 706 updates, based on the product spent characteristics and/or the inventory data, demand data for one or more feed products employed to produce the one or more blending components. In one or more embodiments, the demand data is related to demand associated with the current component inventory 402 and/or the products 406 being blended. In one or more embodiments, the demand data is related to demand associated with the one or more output streams 306 of processed materials (e.g., the refinery products). In one or more embodiments, the demand data includes a maximum demand value (e.g., a maximum demand value plus a predefined demand value) and/or a minimum demand value (e.g., a minimum demand value) for respective product types such as, for example, regular gasoline, premium gasoline, jet gasoline, diesel gasoline, etc. In one or more embodiments, the demand data includes future demand data. For example, in one or more embodiments, the demand data represents predicted demand for a product or product grade for a next M number of days, where M is an integer. In certain embodiments, the demand data accounts for supply chain characteristics of a product such as, for example, multiple liftings and/or deliveries of a product. In one or more embodiments, in response to a change in demand for one or more industrial process products (e.g., the current component inventory 402 and/or the products 406 being blended), the virtual content component 706 updates one or more portions of the demand data.

In one or more embodiments, the control component 708 is configured to generate control data 722 based on the demand data determined by the virtual content component 706. In one or more embodiments, the control data 722 includes one or more control signals configured based on the demand data. In one or more embodiments, the control data 722 includes one or more setpoints for one or more assets. A setpoint is an asset setting (e.g., an asset setpoint) for a respective asset. For instance, in one or more embodiments, the one or more setpoints include one or more voltage values, one or more current values, one or more switch states, and/or one or more other configuration settings for respective assets. In one or more embodiments, the control component 708 transmits the control data 722 (e.g., the one or more control signals) to a controller configured for optimization associated with the industrial process. In one or more embodiments, the controller corresponds to the optimizer controller 502 and/or the one or more multivariable MPC controllers 504*a*-*n*. In one or more embodiments, the control component 708 alters one or more portions of an optimization process (e.g., the continuous optimization subprocess 604) based on the control data 722 (e.g., the one or more control signals). For example, in one or more embodiments, the control component 708 tunes an interval of time for the optimization associated with the industrial process based on the demand data. In one or more embodiments, the control component 708 additionally or alternatively generates one or more batch blending recipes for one or more batch processes (e.g., the discontinuous batch operation subprocess 608) based on the demand data. In one or more embodiments, in response to determining that a batch operation subprocess (e.g., the discontinuous batch operation subprocess 608) satisfies a defined criterion, the control component 708 additionally or alternatively updates one or more portions of the inventory data. For example, in response to determining that a batch operation subprocess is complete (e.g., one or more subprocesses of the discontinuous batch operation subprocess 608 is complete), the control component 708 additionally or alternatively updates one or more portions of the inventory data. In one or more embodiments, in response to determining that a batch operation subprocess (e.g., the discontinuous batch operation subprocess 608) satisfies a defined criterion, the control component 708 additionally or alternatively updates one or more portions of the product spent characteristics. For example, in response to determining that a batch operation subprocess is complete (e.g., one or more subprocesses of the discontinuous batch operation subprocess 608 is complete), the control component 708 additionally or alternatively updates one or more portions of the product spent characteristics.

In certain embodiments, the control component 708 generates a user-interactive electronic interface that renders a visual representation of the demand data. For example, in an embodiment, the control component 708 configures a visualization (e.g., a dashboard visualization for display via a user interface of a computing device). In an embodiment, the user-interactive electronic interface facilitates presentation and/or interaction with one or more portions of the demand data. In one or more embodiments, the user-interactive electronic interface renders one or more interactive media elements via a set of pixels. In another embodiment, the control component 708 transmits, to a computing device, one or more notifications associated with the demand data. In an exemplary embodiment, a notification advises that one or more portions of the industrial process is operating inefficiently. In another embodiment, the control component 708 performs another type of action associated with the application services layer 225, the applications layer 230, and/or the core services layer 235 based on the demand data.

Figure 8:
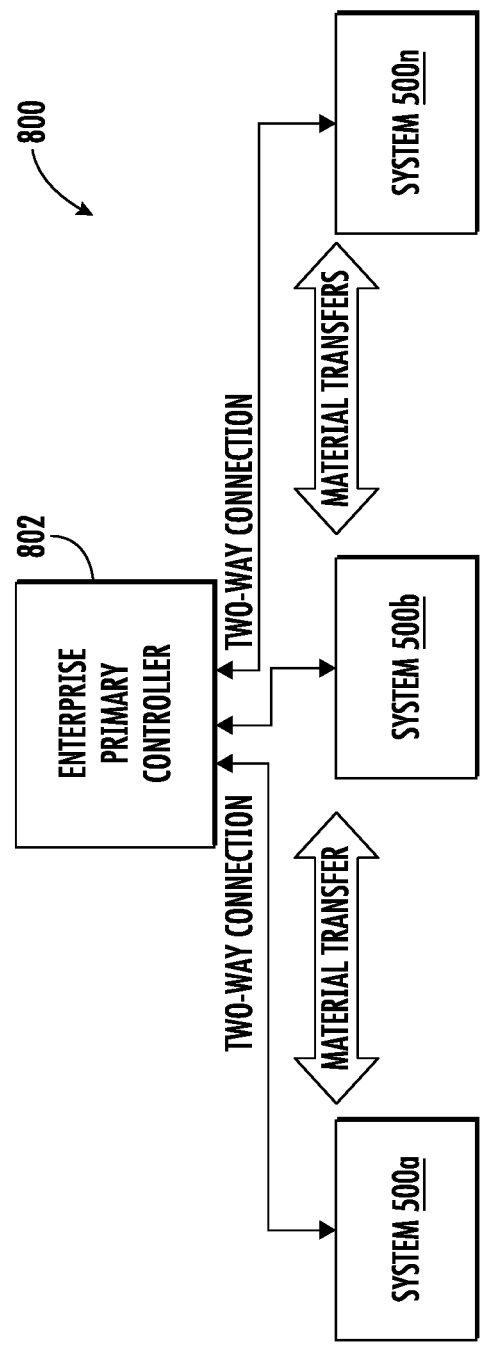
FIG. 8 illustrates a system that provides another cascaded MPC architecture for enterprise-wide control and optimization, in accordance with one or more embodiments described herein.

FIG. 8 illustrates a system 800 according to one or more described features of one or more embodiments of the disclosure. The system 800 includes an enterprise primary controller 802 and a set of systems 500*a*-*n*. Each system from the set of systems 500*a*-*n* corresponds to the system 500. For example, each system from the set of systems 500*a*-*n* includes the optimizer controller 502 and the one or more multivariable MPC controllers 504*a*-*n*. In an embodiment, the system 800 is a tier-3 enterprise-wide optimizer for a supply chain associated with one or more industrial processes. For example, in one or more embodiments, the system 800 is employed to optimize transfer of material between industrial plants where respective industrial plants are associated with respective a respective system 500 from the set of systems 500$a$-$n$. For example, in an embodiment, the system 500$a$ is associated with a first industrial plant, the system 500$b$ is associated with a second industrial plant, and the system 500$n$ is associated with an nth industrial plant. In certain embodiments, the system 800 is employed to improve coordination between multiple refineries and/or multiple fuel/crude depots within a network. In certain embodiments, the system 800 is employed to increase supply chain agility, optimize inventories within an enterprise, and/or reduce inventories within an enterprise. In certain embodiments, the system 800 is employed to optimize transfer or cross-shipping of intermediate materials/parts between industrial plants. In one or more embodiments, the enterprise primary controller 802 is configured in a similar manner as the optimizer controller 502.

Figure 9:
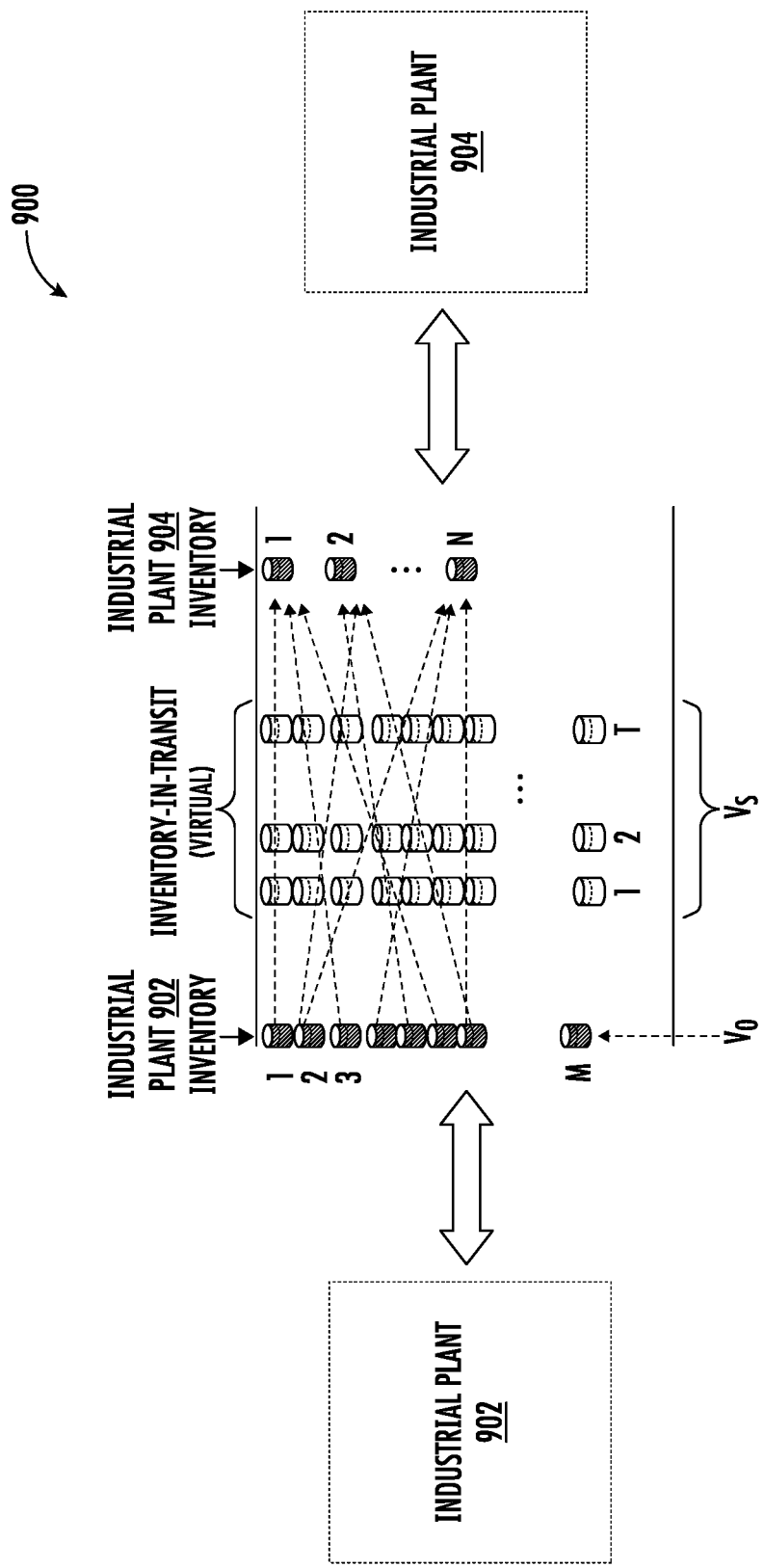
FIG. 9 illustrates a system that provides an enterprise supply chain with transport links, in accordance with one or more embodiments described herein.

FIG. 9 illustrates a system 900 according to one or more described features of one or more embodiments of the disclosure. In one or more embodiments, the system 900 provides an enterprise supply chain with transport links. In one or more embodiments, the system 900 provides tracking of inventory-in-transit. The system 900 includes an industrial plant 902 and an industrial plant 904. For T shipments/transfers, $V_s$ is comprised of T columns of Inventory-in-Transit:

$$V_s = V_{s,1} + V_{s,2} + \ldots + V_{s,T}$$

where each column $V_{s,i}$ represents the Inventory-in-Transit for the i-th shipment/transfer between the industrial plant 902 and the industrial plant 904. In one or more embodiments, this shipment/transfer between the industrial plant 902 and the industrial plant 904 is either on route or has been received. If any shipment is received from the industrial plant 902, an asynchronous updating scheme associated with the inventory-in-transit adds the shipment associated with the industrial plant 902 to the industrial plant 904 inventory, subtracts the shipment associated with the industrial plant 902 from the future demand $P_m$, and reset a corresponding $V_{s,i}$ to zero. If there is any newly confirmed future demand (e.g., since a previous asynchronous updating scheme), the new demand is added to $P_m$.

Figure 10:
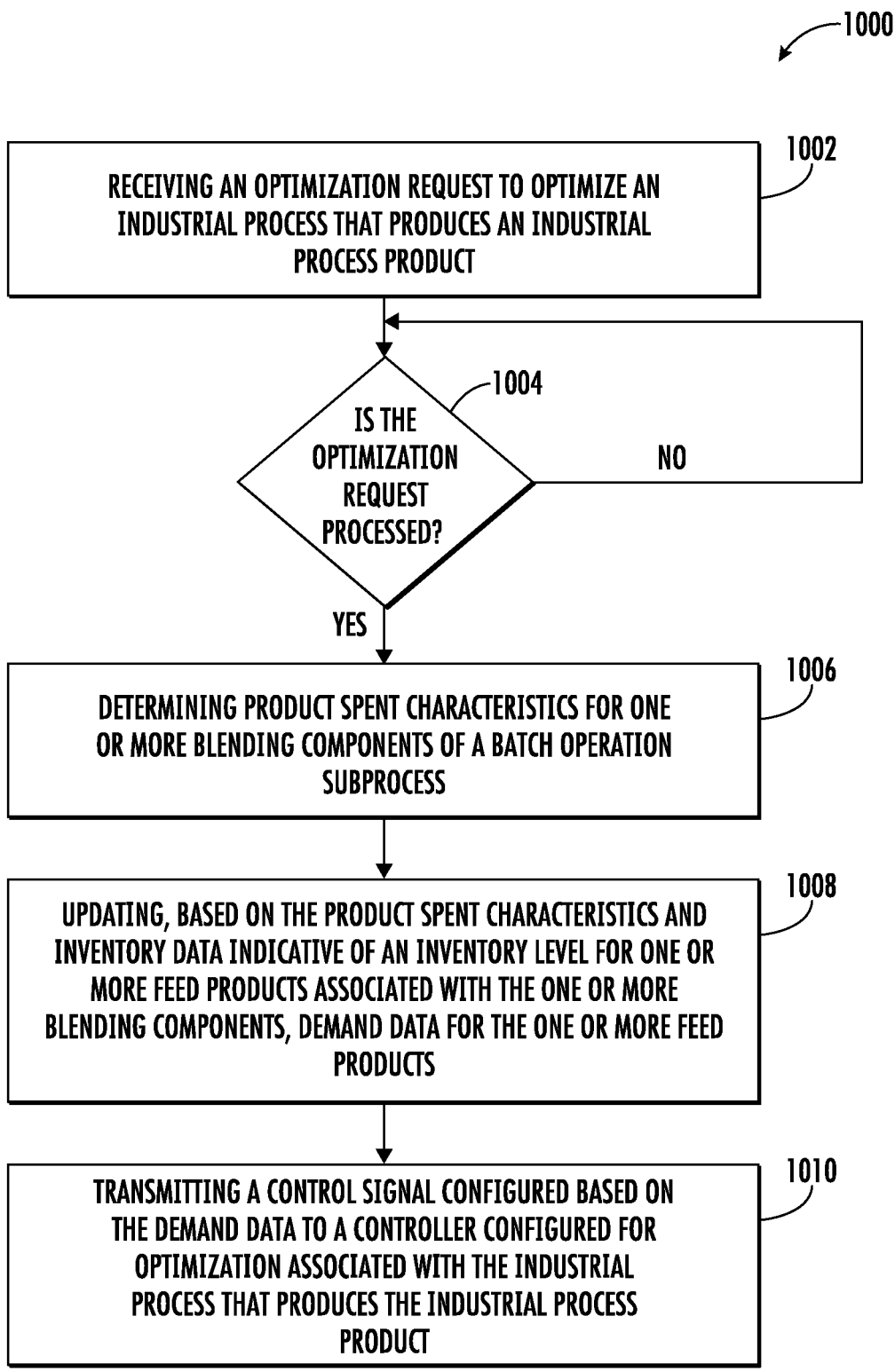
FIG. 10 illustrates a flow diagram for managing industrial process optimization related to batch operations, in accordance with one or more embodiments described herein.

FIG. 10 illustrates a method 1000 for managing industrial process optimization related to batch operations, in accordance with one or more embodiments described herein. The method 1000 is associated with the industrial process computer system 702, for example. For instance, in one or more embodiments, the method 1000 is executed at a device (e.g., the industrial process computer system 702) with one or more processors and a memory. In one or more embodiments, the method 1000 facilitates asynchronous management of an industrial process by monitoring product inventory provided by an optimization subprocess and product spent characteristics of an industrial process product provided by a batch operation subprocess. In one or more embodiments, the method 1000 begins at block 1002 that receives (e.g., by the asynchronous update component 704) an optimization request to optimize an industrial process that produces an industrial process product. The optimization request to optimize the industrial process provides one or more technical improvements such as, but not limited to, facilitating interaction with a computing device, extended functionality for a computing device and/or improving accuracy of data provided to a computing device.

At block 1004, it is determined whether the optimization request is processed. If no, block 1004 is repeated to determine whether the optimization request is processed. If yes, the method 1000 proceeds to block 1006. In response to the optimization request, block 1006 determines (e.g., by the asynchronous update component 704) product spent characteristics for one or more blending components of a batch operation subprocess. The determining the product spent characteristics provides one or more technical improvements such as, but not limited to, extended functionality for a computing device and/or improving accuracy of data provided to a computing device. In certain embodiments, the determining the one or more setpoints comprises determining the one or more setpoints from asset strategy data associated with an operation strategy for the asset.

In response to the optimization request, the method 1000 also includes a block 1008 that, based on the product spent characteristics and inventory data indicative of an inventory level for one or more feed products associated with the one or more blending components, updates (e.g., by the asynchronous update component 704) demand data for the one or more feed products. The updating the demand data provides one or more technical improvements such as, but not limited to, extended functionality for a computing device and/or improving accuracy of data provided to a computing device.

In response to the optimization request, the method 1000 also includes a block 1010 that transmits (e.g., by the control component 708) a control signal configured based on the demand data to a controller configured for optimization associated with the industrial process that produces the industrial process product. The transmitting the control signal provides one or more technical improvements such as, but not limited to, providing a varied experience for a computing device.

In certain embodiments, the receiving the optimization request comprising receiving the inventory data via the optimization request. In certain embodiments, the receiving the optimization request comprising receiving the optimization request from the controller. In certain embodiments, the receiving the optimization request comprising receiving the optimization request in response to a determination that time data for the industrial process satisfies a defined criterion. In certain embodiments, the receiving the optimization request comprising receiving the optimization request in response to a determination that a condition associated with the industrial process satisfies a defined criterion. In certain embodiments, the receiving the optimization request comprising receiving the optimization request from a user device.

In certain embodiments, the determining the product spent characteristics comprising determining the product spent characteristics based on industrial process product characteristics for the industrial process product. In certain embodiments, the determining the product spent characteristics comprising monitoring content of material included in the one or more blending components. In certain embodiments, the determining the product spent characteristics comprising monitoring an amount of material included in the one or more blending components. In certain embodiments, the determining the product spent characteristics comprising determining the product spent characteristics based on one or more virtual spent components for the one or more blending components.

In certain embodiments, the method 1000 additionally or alternatively includes generating one or more batch blending recipes based on the demand data. In certain embodiments, the method 1000 additionally or alternatively includes updating one or more portions of the inventory data in response to determining that the batch operation subprocess satisfies a defined criterion. In certain embodiments, the method 1000 additionally or alternatively includes updating one or more portions of the product spent characteristics in response to determining that the batch operation subprocess satisfies a defined criterion. In certain embodiments, the method 1000 additionally or alternatively includes updating one or more portions of the demand data in response to a change in demand for the industrial process product. In certain embodiments, the method 1000 additionally or alternatively includes tuning an interval of time for the optimization associated with the industrial process based on the demand data.

Figure 11:
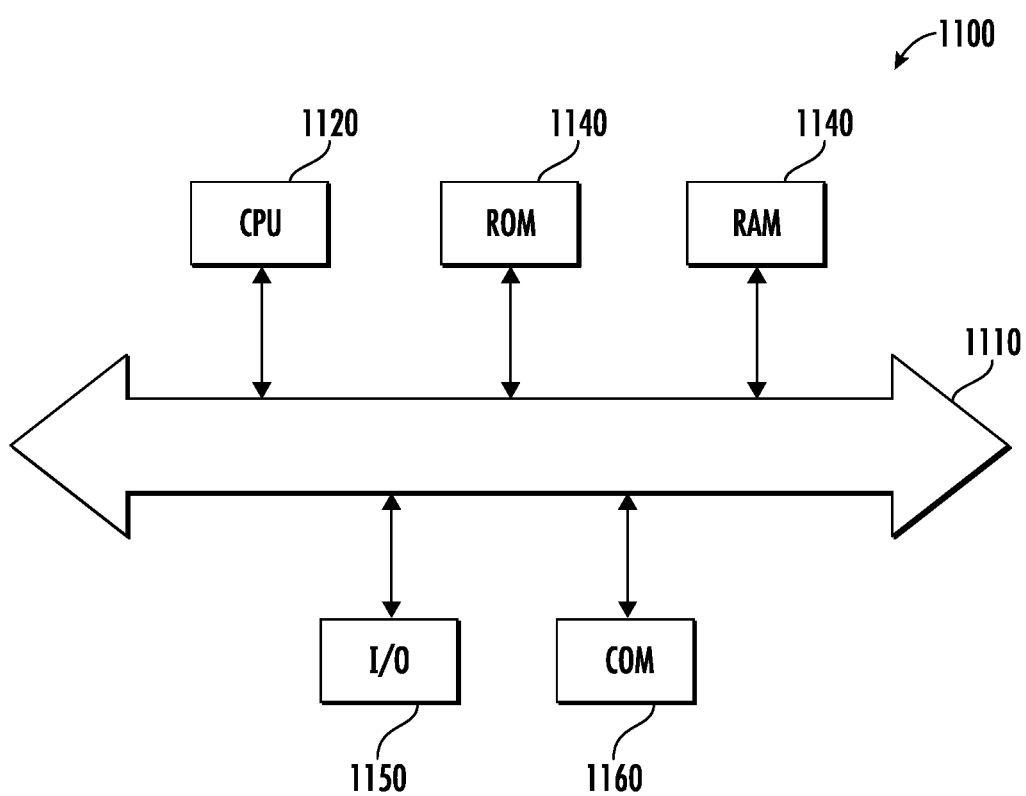
FIG. 11 illustrates a functional block diagram of a computer that may be configured to execute techniques described in accordance with one or more embodiments described herein.

FIG. 11 depicts an example system 1100 that may execute techniques presented herein. FIG. 11 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1160 for packet data communication. The platform also may include a central processing unit ("CPU") 1120, in the form of one or more processors, for executing program instructions. The platform may include an internal communication bus 1110, and the platform also may include a program storage and/or a data storage for various data files to be processed and/or communicated by the platform such as ROM 1130 and RAM 1140, although the system 1100 may receive programming and data via network communications. The system 1100 also may include input and output ports 1150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
   one or more processors;
   a memory; and
   one or more programs stored in the memory, the one or more programs comprising instructions configured to:
      receive an optimization request to optimize an industrial process that produces an industrial process product, wherein the industrial process comprises at least: a batch operation subprocess and a continuous optimization subprocess; and
   in response to the optimization request:
      determine product spent characteristics for one or more blending components of the batch operation subprocess;
      update, based on the product spent characteristics and inventory data indicative of an inventory level for one or more feed products associated with the one or more blending components, demand data for the one or more feed products, wherein the demand data is updated in real-time using an asynchronous update scheme for the one or more feed products of the batch operation subprocess wherein the asynchronous update scheme is configured to harmonize the batch operation subprocess with the continuous optimization subprocess; and
      transmit a control signal configured based on the demand data to a controller configured for optimization associated with the industrial process that produces the industrial process product, wherein the controller alters the continuous optimization subprocess using the control signal.

2. The system of claim 1, the one or more programs further comprising instructions configured to:
   receive the optimization request from the controller.

3. The system of claim 1, the one or more programs further comprising instructions configured to:
   receive the optimization request in response to a determination that time data for the industrial process satisfies a defined criterion.

4. The system of claim 1, the one or more programs further comprising instructions configured to:
   receive the optimization request in response to a determination that a condition associated with the industrial process satisfies a defined criterion.

5. The system of claim 1, the one or more programs further comprising instructions configured to:
   determine the product spent characteristics based on industrial process product characteristics for the industrial process product.

6. The system of claim 1, the one or more programs further comprising instructions configured to:

determine the product spent characteristics based on monitoring content of material included in the one or more blending components.

7. The system of claim 1, the one or more programs further comprising instructions configured to:
determine the product spent characteristics based on monitoring an amount of material included in the one or more blending components.

8. The system of claim 1, the one or more programs further comprising instructions configured to:
determine the product spent characteristics based on one or more virtual spent components for the one or more blending components.

9. The system of claim 1, the one or more programs further comprising instructions configured to:
generate one or more batch blending recipes based on the demand data.

10. The system of claim 1, the one or more programs further comprising instructions configured to:
in response to a determination that the batch operation subprocess satisfies a defined criterion, update one or more portions of the inventory data.

11. The system of claim 1, the one or more programs further comprising instructions configured to:
tune an interval of time for the optimization associated with the industrial process based on the demand data.

12. A method, comprising:
at a device with one or more processors and a memory:
receiving an optimization request to optimize an industrial process that produces an industrial process product, wherein the industrial process comprises at least: a batch operation subprocess and a continuous optimization subprocess; and
in response to the optimization request:
determining product spent characteristics for one or more blending components of the batch operation subprocess;
updating, based on the product spent characteristics and inventory data indicative of an inventory level for one or more feed products associated with the one or more blending components, demand data for the one or more feed products, wherein the demand data is updated in real-time using an asynchronous update scheme for the one or more feed products of the batch operation subprocess, wherein the asynchronous update scheme is configured to harmonize the batch operation subprocess with the continuous optimization subprocess; and
transmitting a control signal configured based on the demand data to a controller configured for optimization associated with the industrial process that produces the industrial process product, wherein the controller alters the continuous optimization subprocess using the control signal.

13. The method of claim 12, the receiving the optimization request comprising receiving the optimization request from the controller.

14. The method of claim 12, the receiving the optimization request comprising receiving the optimization request in response to a determination that time data for the industrial process satisfies a defined criterion.

15. The method of claim 12, the receiving the optimization request comprising receiving the optimization request in response to a determination that a condition associated with the industrial process satisfies a defined criterion.

16. The method of claim 12, the determining the product spent characteristics comprising determining the product spent characteristics based on industrial process product characteristics for the industrial process product or one or more virtual spent components for the one or more blending components.

17. The method of claim 12, the determining the product spent characteristics comprising monitoring content or an amount of material included in the one or more blending components.

18. The method of claim 12, further comprising:
generating one or more batch blending recipes based on the demand data.

19. The method of claim 12, further comprising:
tuning an interval of time for the optimization associated with the industrial process based on the demand data.

20. A non-transitory computer-readable storage medium comprising one or more programs for execution by one or more processors of a device, the one or more programs including instructions which, when executed by the one or more processors, cause the device to:
receive an optimization request to optimize an industrial process that produces an industrial process product, wherein the industrial process comprises at least: a batch operation subprocess and a continuous optimization subprocess; and
in response to the optimization request:
determine product spent characteristics for one or more blending components of the batch operation subprocess;
update, based on the product spent characteristics and inventory data indicative of an inventory level for one or more feed products associated with the one or more blending components, demand data for the one or more feed products, wherein the demand data is updated in real-time using an asynchronous update scheme for the one or more feed products of the batch operation subprocess, wherein the asynchronous update scheme is configured to harmonize the batch operation subprocess with the continuous optimization subprocess; and
transmit a control signal configured based on the demand data to a controller configured for optimization associated with the industrial process that produces the industrial process product, wherein the controller alters the continuous optimization subprocess using the control signal.

* * * * *